(12) United States Patent
Wu et al.

(10) Patent No.: US 10,488,890 B2
(45) Date of Patent: Nov. 26, 2019

(54) ELECTRONIC APPARATUS AND BASE

(71) Applicants: Tung-Ying Wu, Taipei (TW); Yi-Chun Lin, Taipei (TW); Ming-Chung Liu, Taipei (TW)

(72) Inventors: Tung-Ying Wu, Taipei (TW); Yi-Chun Lin, Taipei (TW); Ming-Chung Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/983,103

(22) Filed: May 18, 2018

(65) Prior Publication Data

US 2018/0335810 A1    Nov. 22, 2018

Related U.S. Application Data

(60) Provisional application No. 62/507,801, filed on May 18, 2017.

(51) Int. Cl.
  *G06F 1/16*    (2006.01)

(52) U.S. Cl.
  CPC .......... *G06F 1/1681* (2013.01); *G06F 1/1637* (2013.01); *G06F 1/1654* (2013.01); *G06F 1/1669* (2013.01); *G06F 1/1677* (2013.01); *G06F 1/1679* (2013.01)

(58) Field of Classification Search
  CPC .... G06F 1/1637; G06F 1/1669; G06F 1/1681; G06F 1/1679; G06F 1/1677; G06F 1/1616; G06F 1/1683; G06F 1/1654
  See application file for complete search history.

(56) References Cited

U.S. PATENT DOCUMENTS

| | | | |
|---|---|---|---|
| 8,456,825 B2* | 6/2013 | Miao | H04M 1/0249 292/251.5 |
| 8,831,212 B2 | 9/2014 | Tseng et al. | |
| 2011/0280428 A1 | 11/2011 | Tseng et al. | |
| 2015/0241925 A1* | 8/2015 | Seo | G06F 1/1652 361/679.27 |
| 2016/0062416 A1 | 3/2016 | Hirao et al. | |

FOREIGN PATENT DOCUMENTS

| | | |
|---|---|---|
| CN | 103235638 | 8/2013 |
| TW | M542165 | 5/2017 |

OTHER PUBLICATIONS

"Office Action of Taiwan Counterpart Application," dated Mar. 7, 2019, p. 1-p. 6.

* cited by examiner

*Primary Examiner* — Dimary S Lopez Cruz
*Assistant Examiner* — Ingrid D Wright
(74) *Attorney, Agent, or Firm* — JCIPRNET

(57) ABSTRACT

An electronic apparatus includes an electronic device and a base. The base includes a base body and a connection structure. The connection structure includes a cover and at least one pivot assembly. The pivot assembly is pivoted between the base body and the cover, such that the cover is adapted to pivot between a closed state and an opened state relatively to the base body. The cover and the base body cover the pivot assembly. The cover has a connection segment. When the electronic device is assembled to the base, the connection segment is adapted to be inserted into a slot of the electronic device.

21 Claims, 6 Drawing Sheets

ELECTRONIC APPARATUS AND BASE

CROSS-REFERENCE TO RELATED APPLICATION

This application claims the priority benefit of U.S. provisional application Ser. No. 62/507,801, filed on May 18, 2017. The entirety of the above-mentioned patent application is hereby incorporated by reference herein and made a part of this specification.

BACKGROUND

Technical Field

The invention relates to an electronic apparatus and a base. More particularly, the invention relates to a portable electronic apparatus and a base thereof Description of Related Art Along with technology advancement, portable electronic devices (e.g., tablet PCs or smart phones, and the like) have been extensively used owing to advantages of portability, simple operation, etc. provided by such devices. Since bases configured for supporting are not included in most of the portable electronic devices, and most of the portable electronic devices are not equipped with physical keyboards for users to operate on, the portable electronic devices are currently designed most of the time to be matched with expanding bases. The portable electronic device can be placed in and charged with expanding bases, and keyboard modules are further included for users to perform input.

An expanding base generally has a hinge structure for allowing the portable electronic device to pivot relatively to the expanding base and is electrically connected to and structurally connected to the portable electronic device through a signal terminal and an engaging member. Nevertheless, in an existing expanding base, the hinge cover configured for covering the hinge structure and the casing configured for accommodating the signal terminal and the engaging member are designed to be a structure with discontinuous appearance. Moreover, portions of the signal terminal and the engaging member are exposed out of the casing, as such, the expanding base is less compact in appearance.

SUMMARY

The invention provides an electronic apparatus and a base having a compact appearance.

In an embodiment of the invention, an electronic apparatus includes an electronic device and a base. The base includes a base body and a connection structure. The connection structure includes a cover and at least one pivot assembly. The pivot assembly is pivoted between the base body and the cover, such that the cover is adapted to pivot between a closed state and an opened state relatively to the base body. The cover and the base body cover the pivot assembly. The cover has a connection segment. When the electronic device is assembled to the base, the connection segment is adapted to be inserted into a slot of the electronic device.

In an embodiment of the invention, a base is suited for an electronic device and includes a base body and a connection structure. The connection structure includes a cover, at least one pivot assembly, and at least one engaging member. The pivot assembly is pivoted between the base body and the cover, such that the cover is adapted to pivot between a closed state and an opened state relatively to the base body. The cover and the base body cover the pivot assembly. The cover has a connection segment, and the engaging member is movably connected to the cover and is covered by the connection segment. The connection segment is adapted to be inserted into a slot of the electronic device, and the engaging member is adapted to protrude from the connection segment and be engaged with the electronic device.

In an embodiment of the invention, the base further includes at least one engaging member movably connected to the cover and covered by the connection segment, and the engaging member is adapted to protrude from the connection segment and be engaged with the electronic device.

In an embodiment of the invention, the cover has a curved segment, and the curved segment is connected to the connection segment and covers a portion of the at least one pivot assembly.

In an embodiment of the invention, the pivot assembly extends into the base body from a rear end of the base body. When the cover is in the closed state, the curved segment extends towards the rear end from the connection segment.

In an embodiment of the invention, a portion of the curved segment is located in the base body when the cover is in the opened state.

In an embodiment of the invention, the base body has a recess adjacent to the cover, and the recess provides a space in which the cover pivots relatively to the base body.

In an embodiment of the invention, the base body has an opening portion adjacent to the cover, and the opening portion provides a space in which the cover pivots relatively to the base body. The base includes a blocking plate, and the blocking plate is connected to the base body and covers the opening portion.

In an embodiment of the invention, the blocking plate is pivoted to the base body, and the cover is adapted to pivot relatively to the base body to move to the opening portion and push the blocking plate to pivot relatively to the base body.

In an embodiment of the invention, the pivot assembly includes a first pivot member and a second pivot member pivoted to each other. The first pivot member is connected to the base body and is covered by the base body, and the second pivot member is connected to the cover and is covered by the cover.

In an embodiment of the invention, the first pivot member is a torque element, and the second pivot member is a hinge bracket.

In an embodiment of the invention, the connection structure includes an electrical connection member, and the electrical connection member is disposed in the connection segment and is adapted to be electrically connected to the electronic device.

In an embodiment of the invention, the cover is adapted to pivot along a pivot axis relatively to the base body. A length of the cover is identical to a length of the base body in a direction parallel to the pivot axis.

In an embodiment of the invention, the electronic device has an electrical connection member, and the electrical connection member is disposed within the slot.

To sum up, in the base provided by the embodiments of the invention, the pivot assembly is covered by the base body and the cover of the connection structure, and the engaging member is covered by the connection segment of the cover and is able to be inserted into the slot of the electronic device together with the connection segment. Therefore, the pivot assembly and the engaging member are not exposed out of the connection structure, and moreover, a hinge cover configured for covering the pivot assembly is not required to be additionally disposed, and that the base has a compact appearance at the connection structure.

To make the aforementioned more comprehensible, several embodiments accompanied with drawings are described in detail as follows.

DESCRIPTION OF THE EMBODIMENTS

Figure 1:
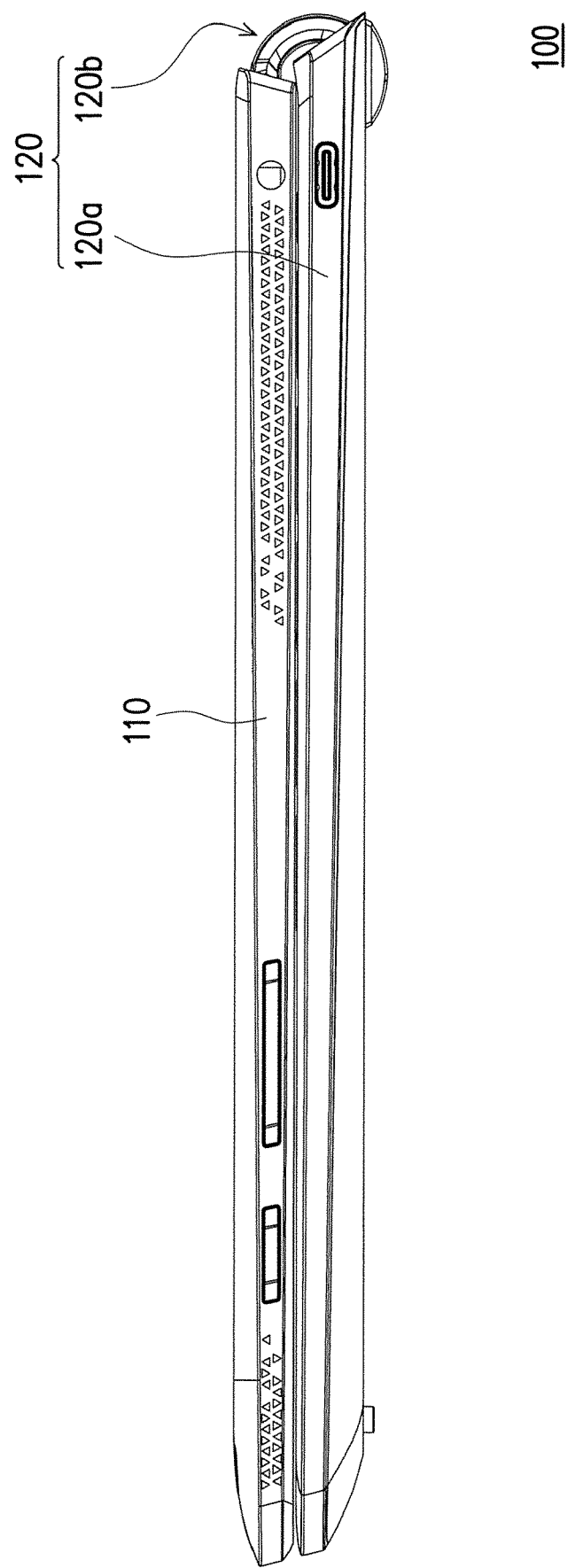
FIG. 1 is side view of an electronic apparatus according to an embodiment of the invention.

FIG. 1 is side view of an electronic apparatus according to an embodiment of the invention. With reference to FIG. 1, an electronic apparatus 100 of this embodiment includes an electronic device 110 and a base 120. The electronic device 110 is, for example, a tablet PC, and the base 120 is, for example, an expanding base corresponding to the tablet PC and includes a base body 120a and a connection structure 120b. The electronic device 110 is connected to the base body 120a through the connection structure 120b.

Figure 2A:
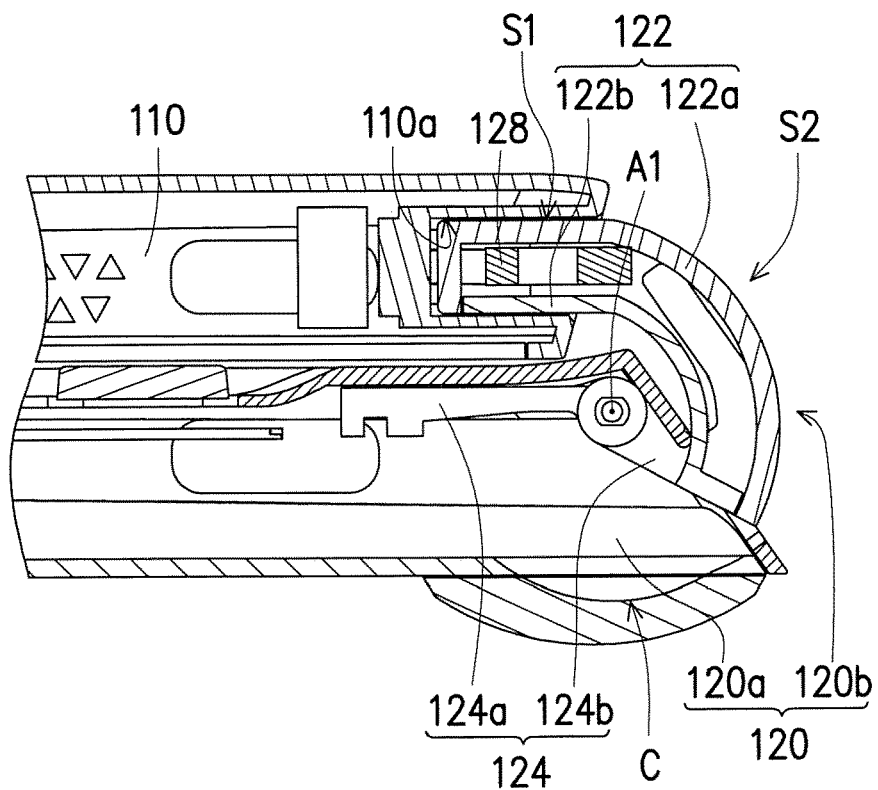
FIG. 2A is a local cross-sectional view of the electronic apparatus of FIG. 1.
Figure 2B:
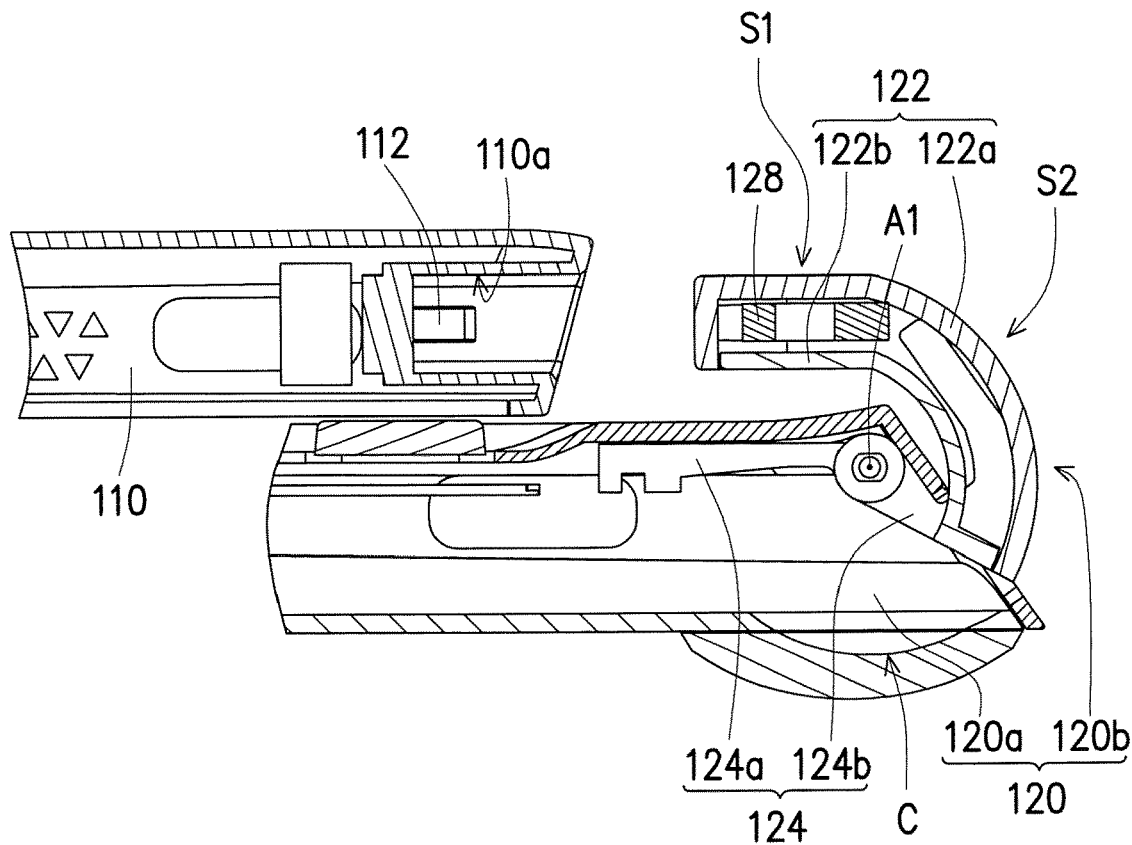
FIG. 2B illustrates the electronic device of FIG. 2A being separated from a connection structure.
Figure 2C:
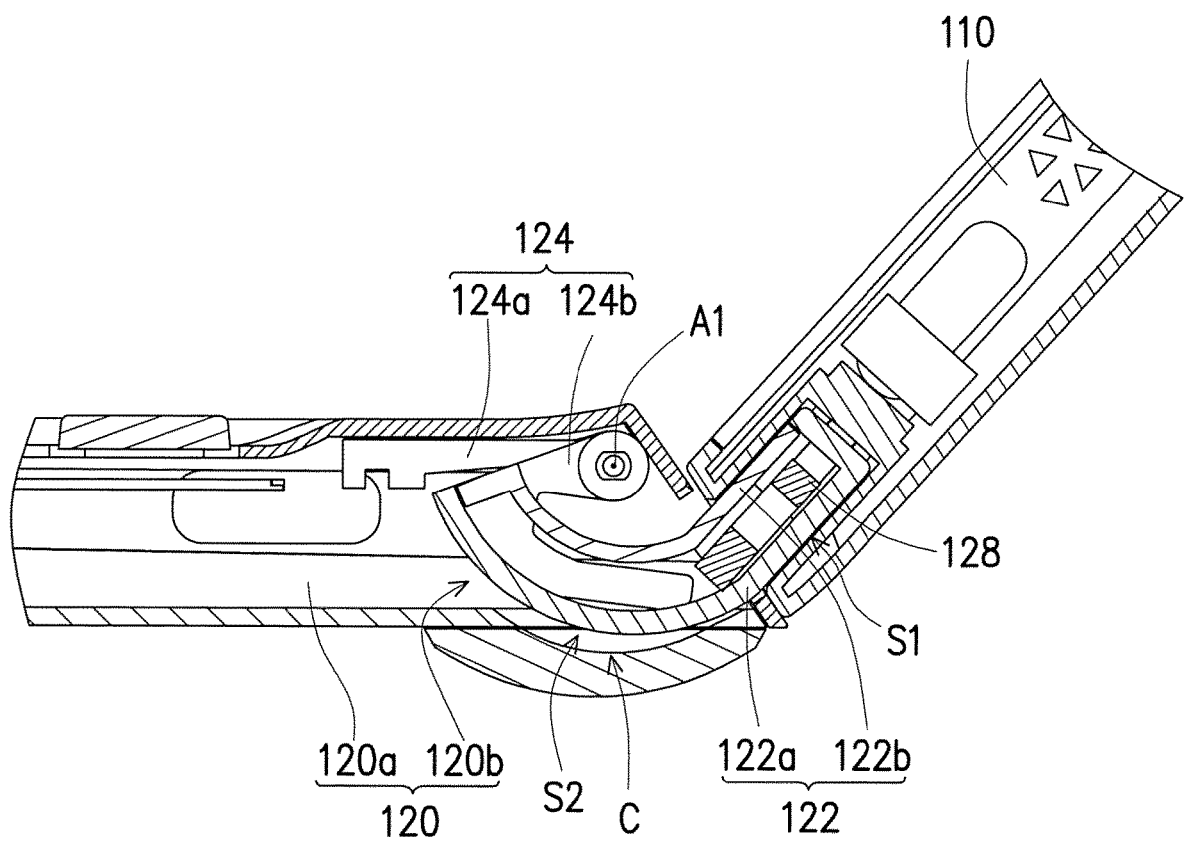
FIG. 2C illustrates a cover and the electronic device of FIG. 2A being opened relatively to the base body.
Figure 3:
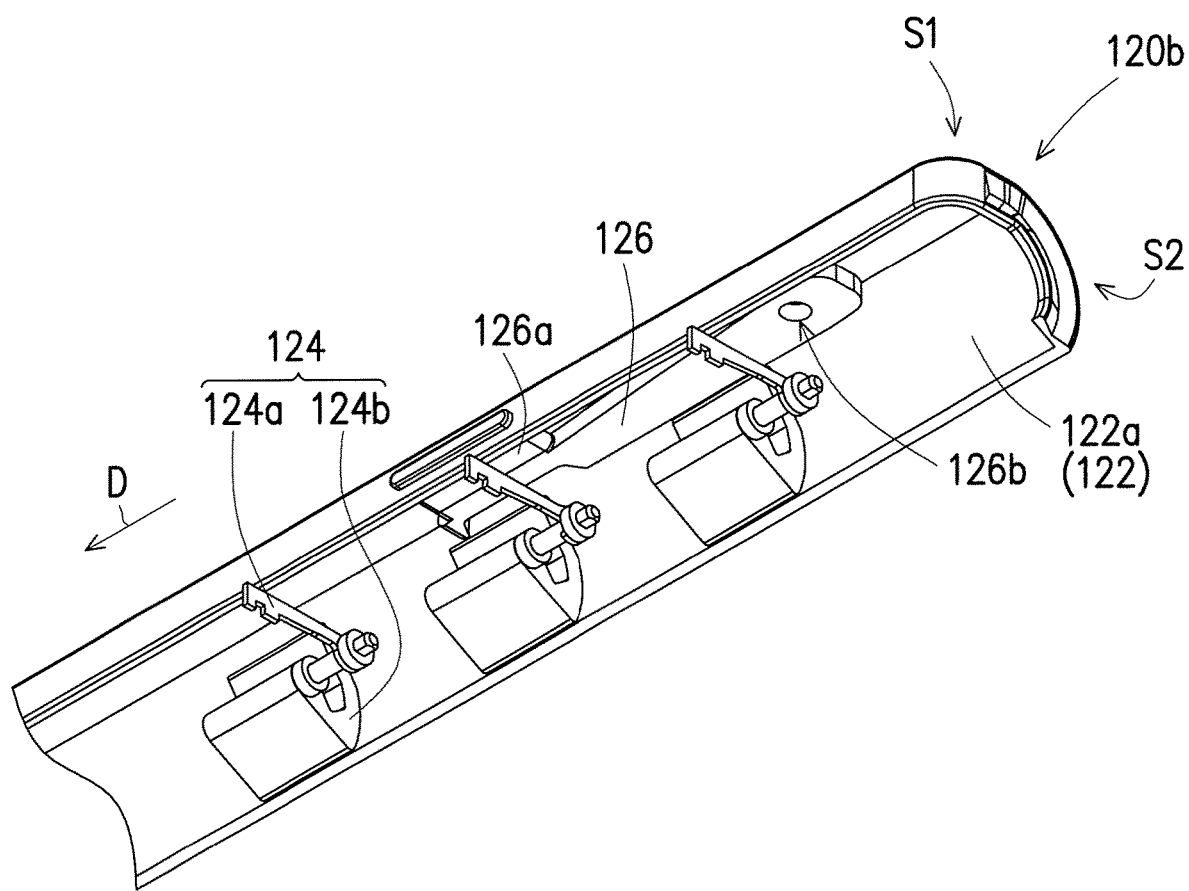
FIG. 3 is a three-dimensional view of the connection structure of FIG. 1.

FIG. 2A is a local cross-sectional view of the electronic apparatus of FIG. 1. FIG. 2B illustrates the electronic device of FIG. 2A being separated from a connection structure. FIG. 2C illustrates a cover and the electronic device of FIG. 2A being opened relatively to the base body. FIG. 3 is a three-dimensional view of the connection structure of FIG. 1. With reference to FIG. 2A to FIG. 2C and FIG. 3, to be specific, the connection structure 120b of this embodiment includes a cover 122, a plurality of pivot assemblies 124, at least one engaging member 126, and an electrical connection member 128 (e.g., a signal terminal or a connection port of the signal terminal). The pivot assemblies 124 are pivoted between the base body 120a and the cover 122, such that the cover 122 is adapted to pivot between a closed state shown in FIG. 2A and an opened state shown in FIG. 2C relatively to the base body 120a. In this way, the electronic device 110 may be closed and opened relatively to the base body 120a. The cover 122 and the base body 120a cover the pivot assemblies 124. The cover 122 has a connection segment S1, and the engaging member 126 is movably connected to the cover 122 and is covered by the connection segment S1. The electrical connection member 128 is disposed in the connection segment S1 of the cover 122.

The connection segment S1 is adapted to be inserted into a slot 110a of the electronic device 110 as shown in FIG. 2A and FIG. 2C and is adapted to be separated from the slot 110a of the electronic device 110 as shown in FIG. 2B. The electronic device 110 has an electrical connection member 112 (e.g., a signal terminal or a connection port of the signal terminal), and the electrical connection member 112 is hidden in the slot 110a of the electronic device 110. When the connection segment S1 is inserted into the slot 110a of the electronic device 110, an engaging end 126a of the engaging member 126 is adapted to protrude from the connection segment S1 and be engaged with the electronic device 110. Moreover, the electrical connection member 128 of the connection structure 120b is connected to the electrical connection member 112 of the electronic device 110. The engaging member 126 of this embodiment is pivoted to the cover 122 through, for example, a pivot portion 126b (e.g., a pivot hole) of the engaging member 126, and an engaging end 126a of the engaging member 126 protrudes towards the electronic device 110 along with pivoting of the engaging member 126 through a magnetic attraction force between the engaging member 126 and the electronic device 110.

As described above, the pivot assemblies 124 are covered by the base body 120a and the cover 122 of the connection structure 120b. The engaging member 126 is covered by the connection segment S1 of the cover 122 and is able to be inserted into the slot 110a of the electronic device 110 together with the connection segment S1, and the electrical connection member 128 is hidden in the connection segment S1 of the cover 122. Therefore, the pivot assemblies 124, the engaging member 126, and the electrical connection member 128 are not exposed out of the connection structure 120b, and that, a hinge cover configured for covering the pivot assemblies 124 is not required to be additionally disposed, and that the base 120 has a compact appearance at the connection structure 120b.

In this embodiment, the cover 122 is adapted to pivot along a pivot axis A1 relatively to the base body 120a. In a direction D (shown in FIG. 3) parallel to the pivot axis A1, a length of the cover 122 is, for example, identical to a length of the base body 120a. As such, consistency in length of the cover 122 and the base body 120a further contributes to the compact design of the appearance.

In this embodiment, the cover 122 is composed of, for example, an upper cover 122a and a lower cover 122b. The cover 122 has a curved segment S2, and the curved segment S2 is connected to the connection segment S1 and covers a portion of the pivot assembly 124. To be specific, the pivot assembly 124 includes a first pivot member 124a and a second pivot member 124b. The first pivot member 124a is connected to the base body 120a and is covered by the base body 120a. The first pivot member 124a is a torque element and is secured in the base body 120a through, for example, engagement, locking, or other appropriate manners. The second pivot member 124b is a hinge bracket, is connected to the cover 122 and extends into the base body 120a from a rear end of the base body 120a, and is pivoted to the first pivot member 124a along the pivot axis A1. The hinge bracket enables the cover to pivot between the closed state and the opened state relatively to the base body, and the torque element provides pivoting torque. When the cover 122 is in the closed state as shown in FIG. 2A, the curved segment S2 of the cover 122 extends towards the rear end of the base body 120a from the connection segment S1 to cover the second pivot member 124b extending from the rear end of the base body 120a.

In addition, when the cover 122 is in the opened state as shown in FIG. 2C, a portion of the curved segment S2 of the cover 122 is located in the base body 120a. The base body 120a of this embodiment has a recess C adjacent to the cover 122, and the recess C provides a space in which the cover 122 pivots relatively to the base body 120a. In this way, the curved segment S2 of the cover 122 may smoothly enter into the base body 120a as shown in FIG. 2C.

Figure 4A:
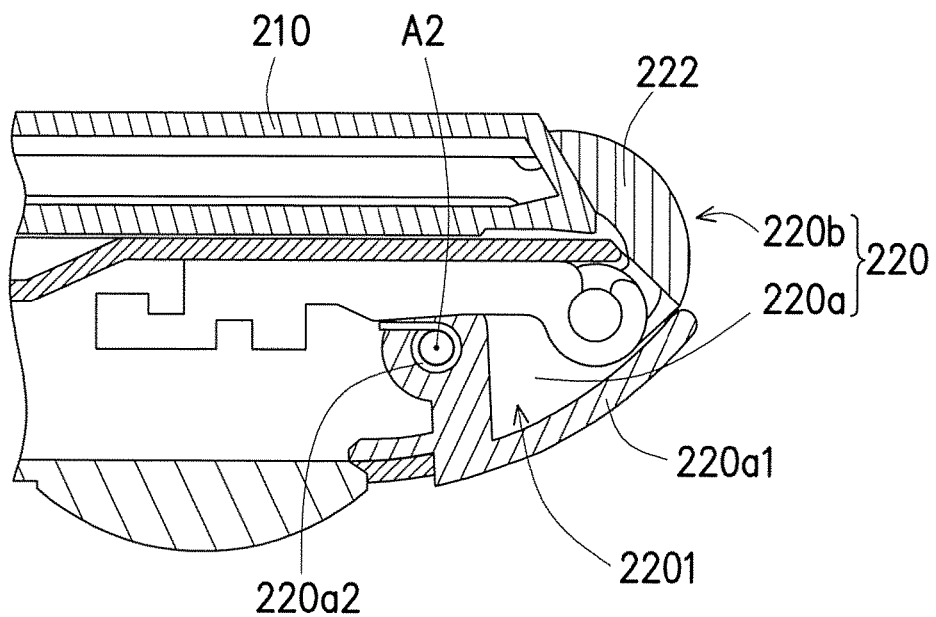
FIG. 4A is a local cross-sectional view of an electronic apparatus according to another embodiment of the invention.
Figure 4B:
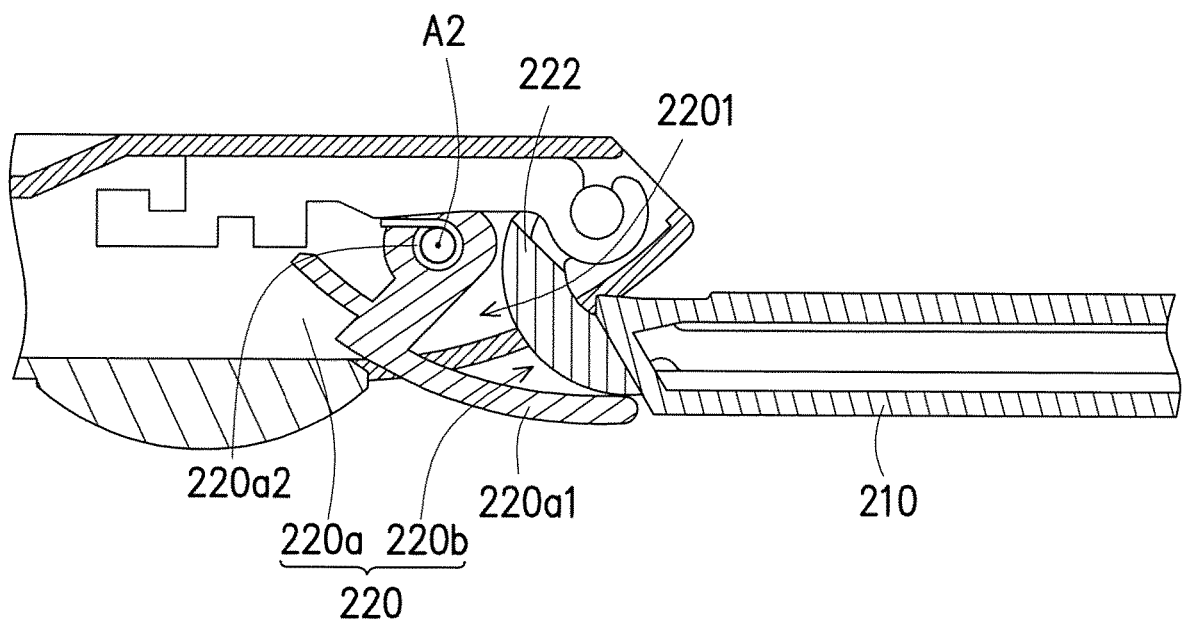
FIG. 4B illustrates a cover and an electronic device of FIG. 4A being opened relatively to a base body.

FIG. 4A is a local cross-sectional view of an electronic apparatus according to another embodiment of the invention. FIG. 4B illustrates a cover and an electronic device of FIG. 4A being opened relatively to a base body. In the embodiment shown in FIG. 4A and FIG. 4B, a manner in which an electronic device 210, a base 220, a base body 220a, a connection structure 220b, and a cover 222 are disposed and operated is similar to that in which the electronic device 110, the base 120, the base body 120a, the connection structure 120b, and the cover 122 are disposed and operated as shown in FIG. 2A and FIG. 2C and thus is not repeated hereinafter. A difference between the embodiment shown in FIG. 4A and FIG. 4B and the embodiment shown in FIG. 2A and FIG. 2C includes that the base body 220a has an opening portion 2201 adjacent to the cover 222, and the opening portion 2201 provides a space in which the cover 222 pivots relatively to the base body 220a. As such, the cover 222 may pivot from a state shown in FIG. 4A to a state shown in FIG. 4B. In addition, the base 220 includes a blocking plate 220a1. The blocking plate 220a1 is pivoted to the base body 220a along a pivot axis A2 and covers the opening portion 2201, and that the opening portion 2201 is prevented from affecting an appearance of the base 220. The cover 222 is adapted to pivot from the state shown in FIG. 4A to the state shown in FIG. 4B relatively to the base body 220a, so as to move to the opening portion 2201 and push the blocking plate 220a1 to pivot relatively to the base body 220a. In addition, an elastic member 220a2 (e.g., a torsional spring) is disposed at a hinge (i.e., at the pivot axis A2) of the blocking plate 220a1, such that, the blocking plate 220a1 may return to a position in the state shown in FIG. 4A from the state shown in FIG. 4B through an elastic force of the elastic member 220a2.

Figure 5A:
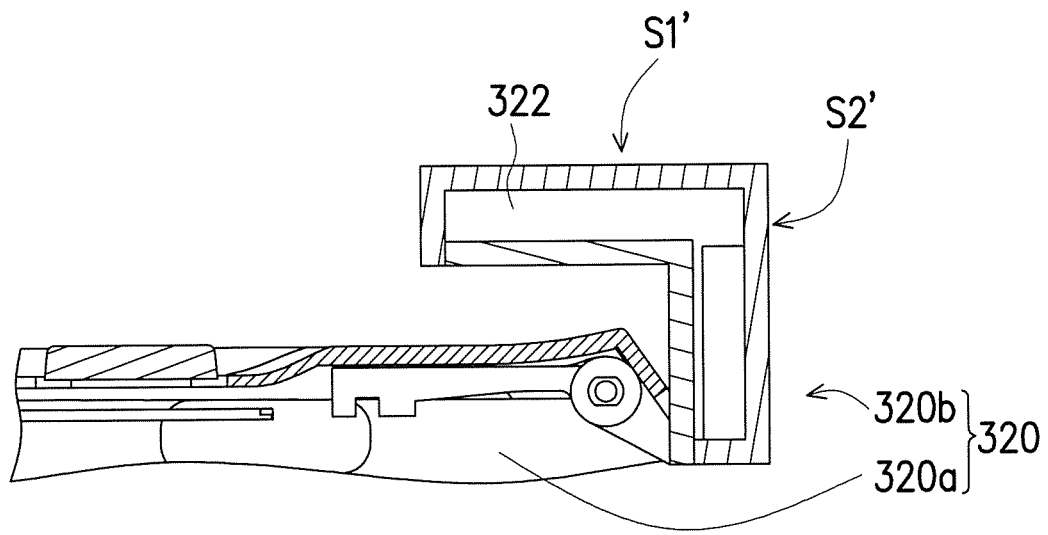
FIG. 5A is a local cross-sectional view of a base according to another embodiment of the invention.

FIG. 5A is a local cross-sectional view of a base according to another embodiment of the invention. In the embodiment shown in FIG. 5A, a manner in which a base 320, a base body 320a, and a connection structure 320b are disposed and operated is similar to that in which the base 120, the base body 120a, and the connection structure 120b are disposed and operated as shown in FIG. 2A and thus is not repeated hereinafter. A difference between the embodiment of FIG. 5A and the embodiment of FIG. 2A includes that a connection segment S1' of a cover 322 and a curved segment S2' of the cover 322 of FIG. 5A are connected and form a single curved structure while the connection segment S1 of the cover 122 and the curved segment S2 of the cover 122 of FIG. 2A are smoothly connected.

Figure 5B:
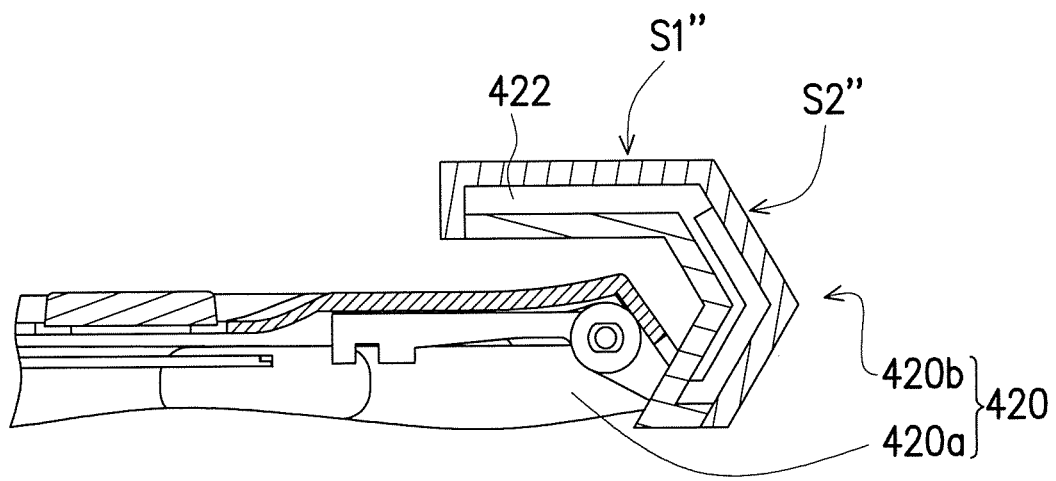
FIG. 5B is a local cross-sectional view of a base according to another embodiment of the invention.

FIG. 5B is a local cross-sectional view of a base according to another embodiment of the invention. In the embodiment shown in FIG. 5B, a manner in which a base 420, a base body 420a, and a connection structure 420b are disposed and operated is similar to that in which the base 120, the base body 120a, and the connection structure 120b are disposed and operated as shown in FIG. 2A and thus is not repeated hereinafter. A difference between the embodiment of FIG. 5B and the embodiment of FIG. 2A includes that a connection segment S1" of a cover 422 and a curved segment S2" of the cover 422 of FIG. 5B are connected and form a polygon curved structure while the connection segment S1 of the cover 122 and the curved segment S2 of the cover 122 of FIG. 2A are smoothly connected.

In view of the foregoing, in the base provided by the embodiments of the invention, the pivot assemblies are covered by the base body and the cover of the connection structure, the engaging member is covered by the connection segment of the cover and is able to be inserted into the slot of the electronic device together with the connection segment, and the electrical connection member is hidden in the connection segment of the cover. Therefore, the pivot assemblies, the engaging member, and the electrical connection member are not exposed out of the connection structure, and moreover, the hinge cover configured for covering the pivot assemblies is not required to be additionally disposed, and that the base has a compact appearance at the connection structure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus, comprising:
   an electronic device; and
   a base, comprising:
      a base body; and
      a connection structure, comprising a cover and at least one pivot assembly, wherein the at least one pivot assembly is pivoted between the base body and the cover, such that the cover is adapted to pivot between a closed state and an opened state relatively to the base body, the cover and the base body cover the at least one pivot assembly, the cover has a connection segment, and the connection segment is adapted to be inserted into a slot of the electronic device when the electronic device is assembled to the base,
   wherein the base body has an opening portion adjacent to the cover, the opening portion provides a space in which the cover pivots relatively to the base body, the base comprises a blocking plate, and the blocking plate is connected to the base body and covers the opening portion.

2. The electronic apparatus as claimed in claim 1, wherein the base further comprises at least one engaging member movably connected to the cover and covered by the connection segment, and the at least one engaging member is adapted to protrude from the connection segment and be engaged with the electronic device.

3. The electronic apparatus as claimed in claim 1, wherein the cover has a curved segment, and the curved segment is connected to the connection segment and covers a portion of the at least one pivot assembly.

4. The electronic apparatus as claimed in claim 3, wherein the at least one pivot assembly extends into the base body from a rear end of the base body, and the curved segment extends towards the rear end from the connection segment when the cover is in the closed state.

5. The electronic apparatus as claimed in claim 3, wherein a portion of the curved segment is located in the base body when the cover is in the opened state.

6. The electronic apparatus as claimed in claim 1, wherein the blocking plate is pivoted to the base body, and the cover is adapted to pivot relatively to the base body to move to the opening portion and push the blocking plate to pivot relatively to the base body.

7. The electronic apparatus as claimed in claim 1, wherein the at least one pivot assembly comprises a first pivot member and a second pivot member pivoted to each other, the first pivot member is connected to the base body and is covered by the base body, and the second pivot member is connected to the cover and is covered by the cover.

8. The electronic apparatus as claimed in claim 7, wherein the first pivot member is a torque element, and the second pivot member is a hinge bracket.

9. The electronic apparatus as claimed in claim 1, wherein the connection structure comprises an electrical connection member, and the electrical connection member is disposed in the connection segment and is adapted to be electrically connected to the electronic device.

10. The electronic apparatus as claimed in claim 1, wherein the cover is adapted to pivot along a pivot axis relatively to the base body, and a length of the cover is identical to a length of the base body in a direction parallel to the pivot axis.

11. The electronic apparatus as claimed in claim 1, wherein the electronic device has an electrical connection member, and the electrical connection member is disposed within the slot.

12. A base for an electronic device, comprising:
a base body; and
a connection structure, comprising a cover and at least one pivot assembly, wherein the at least one pivot assembly is pivoted between the base body and the cover, such that the cover is adapted to pivot between a closed state and an opened state relatively to the base body, the cover and the base body cover the at least one pivot assembly, the cover has a connection segment, and the connection segment is adapted to be inserted into a slot of the electronic device when the electronic device is assembled to the base,
wherein the base body has an opening portion adjacent to the cover, the opening portion provides a space in which the cover pivots relatively to the base body, the base comprises a blocking plate, and the blocking plate is connected to the base body and covers the opening portion.

13. The base as claimed in claim 12, further comprising at least one engaging member, movably connected to the cover and covered by the connection segment, wherein the at least one engaging member is adapted to protrude from the connection segment and be engaged with the electronic device.

14. The base as claimed in claim 12, wherein the cover has a curved segment, and the curved segment is connected to the connection segment and covers a portion of the at least one pivot assembly.

15. The base as claimed in claim 14, wherein the at least one pivot assembly extends into the base body from a rear end of the base body, and the curved segment extends towards the rear end from the connection segment when the cover is in the closed state.

16. The base as claimed in claim 14, wherein a portion of the curved segment is located in the base body when the cover is in the opened state.

17. The base as claimed in claim 12, wherein the blocking plate is pivoted to the base body, and the cover is adapted to pivot relatively to the base body to move to the opening portion and push the blocking plate to pivot relatively to the base body.

18. The base as claimed in claim 12, wherein the at least one pivot assembly comprises a first pivot member and a second pivot member pivoted to each other, the first pivot member is connected to the base body and is covered by the base body, and the second pivot member is connected to the cover and is covered by the cover.

19. The base as claimed in claim 18, wherein the first pivot member is a torque element, and the second pivot member is a hinge bracket.

20. The base as claimed in claim 12, wherein the connection structure comprises an electrical connection member, and the electrical connection member is disposed in the connection segment and is adapted to be electrically connected to the electronic device.

21. The base as claimed in claim 12, wherein the cover is adapted to pivot along a pivot axis relatively to the base body, and a length of the cover is identical to a length of the base body in a direction parallel to the pivot axis.

* * * * *